United States Patent [19]

Hawkins

[11] 4,344,328
[45] Aug. 17, 1982

[54] FREQUENCY DETECTOR

[75] Inventor: Royal R. Hawkins, Bloomington, Minn.

[73] Assignee: Sundstrand Corporation, Rockford, Ill.

[21] Appl. No.: 94,137

[22] Filed: Nov. 14, 1979

[51] Int. Cl.$^3$ ............................................. G01H 13/00
[52] U.S. Cl. ........................................ 73/651; 73/658
[58] Field of Search ................. 73/579, 651, 658, 659, 73/660, 517 AV, DIG. 1, 778

[56] References Cited

U.S. PATENT DOCUMENTS

| | | | |
|---|---|---|---|
| 2,424,864 | 7/1947 | Treseder | 73/651 |
| 3,124,961 | 3/1964 | Bedford | 73/517 AV |
| 3,146,057 | 8/1964 | Rona | 73/651 |
| 3,403,548 | 10/1968 | Petrik et al. | 73/579 |
| 4,041,783 | 8/1977 | Shimauchi et al. | 73/579 |
| 4,257,747 | 3/1981 | Goldman | 73/651 |

Primary Examiner—Stephen A. Kreitman
Attorney, Agent, or Firm—Ted E. Killingsworth; Michael B. McMurry; Harold A. Williamson

[57] ABSTRACT

A frequency detector for detecting the frequency of vibration of an apparatus is disclosed having a first vibration sensor for providing a first output having a first frequency response to the vibration, a second vibration sensor for providing a second output having a second frequency response to the vibration where the first and second frequency responses envelope the desired frequency of vibration for the apparatus, a difference sensor connected to the first and second vibration sensors for providing a third output dependent upon the difference between the first and second outputs, and a load which is responsive to the third output.

19 Claims, 4 Drawing Figures

FREQUENCY DETECTOR

BACKGROUND OF THE INVENTION

The invention relates to a frequency detector for detecting the frequency of vibration of an apparatus.

Vibration sensing devices, which are economical and free from the problems which typically plague frequency-to-voltage converters, can find a wide variety of applications. For example, pavement ripping machines which are used to tear up concrete and asphalt prior to the roadway being resurfaced often rely upon chisels which are vibrated so that they repeatedly impact the road and, thereby, break up the old pavement. The frequency of vibration must be closely controlled, however, so that the chisels do not go into resonance which might tend to injure or destroy the machine. If a system utilizing a practical frequency sensing arrangement could be devised, then the frequency at which the chisels impact the road can be optimally controlled at just below the resonant frequency to yield the maximum effectiveness for ripping up the old pavement.

A second example where frequency-to-voltage detectors may be used is in the control of alternators. In vehicles such as those used for building and maintaining roadways, the engine of the machine drives a hydraulic pump which in turn drives a hydraulic motor for turning the alternator to produce the electric power utilized by the machine. It is desirable on such machines to precisely control the frequency of the output signal from the alternator. The vibration of the housing of the alternator is dependent upon the frequency of rotation of the rotor of the alternator and thus the frequency of the output signal from the stator of the alternator. A frequency detector for determining the frequency of vibration of the alternator housing can be used to control the pump for controlling the amount of fluid supplied to the hydraulic motor and thus the rotation of the rotor to precisely control the frequency of the output signal from the alternator.

Prior art frequency detection systems have been limited by temperature drift problems. Specifically, prior art frequency-to-voltage converters have relied upon capacitors to receive a cyclical input signal and to provide a steady state output signal whose value is dependent upon the frequency of the input signal. The output signal from such capacitors, however, is dependent upon the ambient temperature to which the capacitors are exposed. Thus, as the temperature drifts, the value of the capacitor will drift and provide an improper reading of the frequency of vibration of the apparatus being sensed.

SUMMARY OF THE INVENTION

The present invention is immune to ambient conditions since the apparatus according to the invention measures the difference between the outputs of two frequency sensors. These outputs drift according to ambient conditions because of thermal expansion of the vibrating reed. The thermal expansion, and therefore the drift, is very small. Accordingly, the present invention comprises a first vibration sensor for providing a first output having a first frequency response to the vibrations of the apparatus, a second vibration sensor for providing a second output having a second frequency response to the vibrations, a difference sensor for providing a third output dependent upon the difference between the first and second outputs, and a load which is responsive to the third output.

BRIEF DESCRIPTION OF THE DRAWINGS

These and other features and advantages will become apparent from a detailed consideration of the invention when taken in conjunction with the drawings in which.

DETAILED DESCRIPTION

Figure 1:
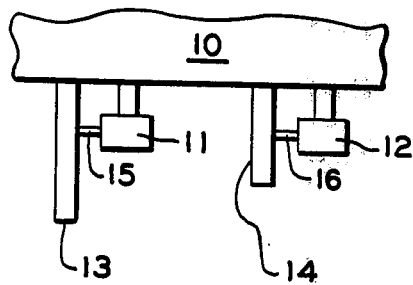
FIG. 1 shows the frequency-to-voltage transducers mounted to the apparatus under test.

In FIG. 1, apparatus 10, which is partially shown, has mounted thereto first and second amplitude-to-voltage transducers 11 and 12. Also mounted to apparatus 10 are reeds 13 and 14 having corresponding first and second differing lengths. The lengths of the reeds 13 and 14 are chosen such that their frequency responses differ and envelope the desired frequency of vibration for apparatus 10. Amplitude-to-voltage transducers 11 and 12 have corresponding pickup members 15 and 16 for transmitting the vibrations of reeds 13 and 14 thereto. Amplitude-to-voltage transducers 11 and 12 may be standard crystal phonograph cartridges or other similar sensors for transducing the vibrations of reeds 13 and 14 into electrical signals.

Figure 2:
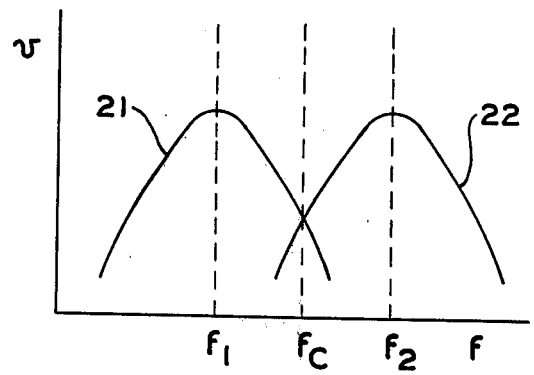
FIG. 2 shows the frequency response curves for the two sensors shown in FIG. 1.

As shown in FIG. 2, curve 21 represents the voltage versus frequency response of transducer 11 as it senses the vibrations of reed 13 and curve 22 represents the voltage versus frequency response of transducer 12 as it senses the vibrations of reed 14. Since reed 13 is longer than reed 14, curve 21 will reach a peak voltage at a lower frequency than does reed 14 as sensed by transducer 12. The lengths of reeds 13 and 14 are selected so that these peak voltages occur at frequencies $f_1$ and $f_2$ respectively. Moreover, the lengths of reeds 13 and 14 are selected so that the center frequency $f_c$, the point at which curves 21 and 22 intersect, is between frequencies $f_1$ and $f_2$. The center frequency does not have to be precisely halfway between frequencies $f_1$ and $f_2$.

Figure 3:
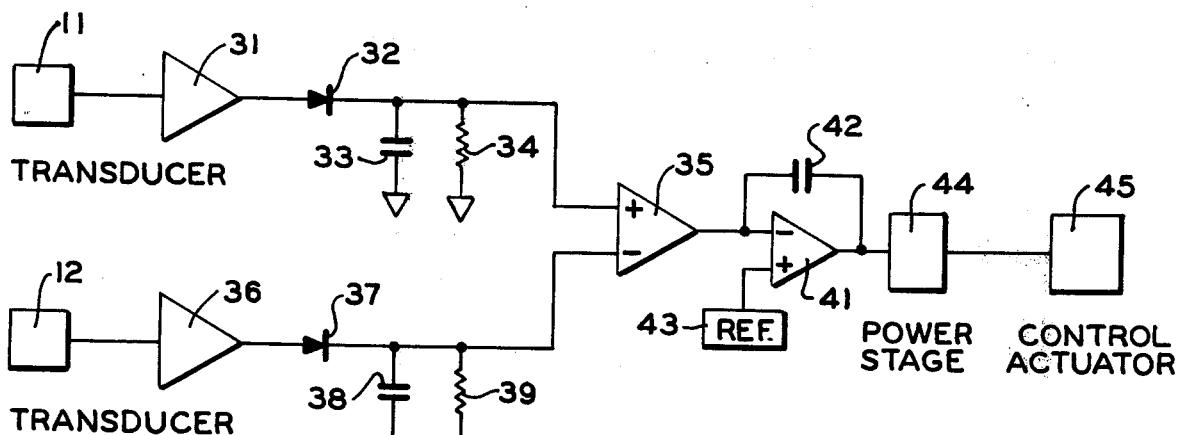
FIG. 3 is a schematic diagram of the circuit for processing the signals derived from the two frequency-to-voltage transducers; and, FIG. 4 shows one application of the invention shown in FIGS. 1–3.

FIG. 3 shows the system for utilizing the outputs from transducers 11 and 12. Specifically, the output of transducer 11 is amplified by amplifier 31 and rectified by diode 32. The signal out of diode 32 is then filtered by capacitor 33 and resistor 34 connected between the output of rectifier 32 and ground. This filtered signal is connected to the positive input of amplifier 35. The output from transducer 12 is amplified by amplifier 36 and rectified by diode 37. The signal from diode 37 is filtered by capacitor 38 and resistor 39 connected in parallel between the output of diode 37 and ground. The filtered signal is then connected to the negative input of amplifier 35.

The output from amplifier 35 represents the difference between the outputs from transducer 11 and transducer 12. It can be seen from this circuit that if the signal to the positive input of amplifier 35 drifts with temperature or other ambient conditions, the input to the negative terminal of amplifier 35 will likewise drift in the same direction and by the same amount. Thus, the difference output from amplifier 35 will not change unless the frequency at which apparatus 10 vibrates changes. If the frequency at which apparatus 10 vibrates falls below frequency $f_c$, The voltage from transducer 11 increases in magnitude whereas the voltage from transducer 12 decreases in magnitude. This increasing voltage in the positive direction is fed through amplifier 35 to the rest of the processing circuit. On the other hand, if the frequency of the apparatus 10 increases, the output from transducer 11 will decrease and the output from transducer 12 will increase thereby lowering the output from amplifier 35. Thus, as the frequency of apparatus 10 changes, the output of amplifier 35 will change and this changing output can be used to either provide an indication of the frequency of apparatus 10 or to control the vibrational frequency of apparatus 10.

The output signal from amplifier 35 is connected to the negative input of reset amplifier 41 which has a feedback capacitor 42 connected from its output to its negative input terminal. A reference level for amplifier 41 is established by reference 43. Reset amplifier 41 eliminates the droop in the system so that apparatus 10 can be controlled very tightly around the desired frequency. The output from amplifier 41 is then power amplified by power stage 44 and is used to operate control actuator 45. Control actuator 45 may be any type of actuator which controls the vibrational frequency of apparatus 10.

Figure 4:
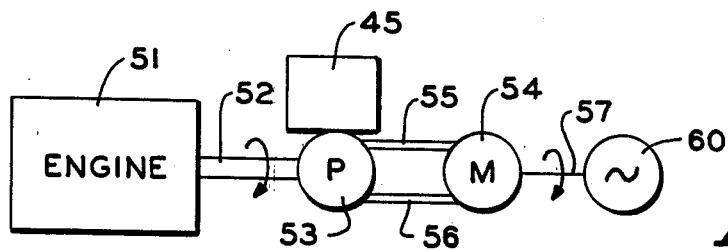

In accordance with the alternator example given above, apparatus 10 may be actuated by an electro magnetic actuator which is driven by the "60 Hz" alternator output. The alternator may be located on a vehicle which is powered by engine 51 shown in FIG. 4. The output shaft 52 of engine 51 drives pump 53 which provides hydraulic fluid to motor 54 by way of lines 55 and 56. Output shaft 57 from hydraulic motor 54 then turns the rotor of alternator 60 which has apparatus 10 as shown in FIG. 1. Control actuator 45 is designed to control the swash plate of pump 53 and, therefore, the amount or flow of hydraulic fluid supplied by pump 53 through lines 55 and 56 to motor 54.

If the output of alternator 60 is designed to be a 60 Hz signal, the desired vibrational frequency $f_c$ for apparatus 10 is chosen to sense a 60 Hz signal from alternator 60. Reeds 13 and 14 are chosen to have lengths which will provide a frequency response so that frequencies $f_1$ and $f_2$ envelope frequency $f_c$, preferably but not necessarily at the midpoint between frequencies $f_1$ and $f_2$. As the vibrational frequency of apparatus 10 increases above $f_c$, the output from amplifier 35 decreases in a negative direction which results in an increasing signal from amplifier 41, is amplified at 44 and is used to operate control actuator 45 to reduce the rotational speed of shaft 57 for reducing the vibration of apparatus 10 so that the frequency output from alternator 60 is reduced back to 60 Hz. If, on the other hand, the rotor connector to shaft 57 decreases in speed, the frequency from alternator 60 drops below 60 Hz and the vibrations of apparatus 10 fall below $f_c$. A decreasing frequency of vibration for apparatus 10 results in an increased output from amplifier 35 and a decreasing output from amplifier 41 which is utilized to operate control actuator 45 to increase the speed of shaft 57 for increasing the frequency output from alternator 60 back to 60 Hz and increasing the frequency of vibrations for apparatus 10 back to $f_c$.

As stated above, frequencies $f_1$ and $f_2$ are determined by the lengths of reeds 13 and 14. Frequency $f_c$ can be changed from that shown in FIG. 2. Thus, the gains of amplifiers 31 and 36 can be respectively altered so that the point $f_c$ is made to vary between $f_1$ and $f_2$. Also, summing junctions can be inserted into the lines connecting transducer 11 to positive input terminal of amplifier 35 and transducer 12 to the negative input of amplifier 35. Connected to each summing junction could be a variable input either one or both of which may be used to alter frequency $f_c$. Other changes may be made in the system as described herein without departing from the scope of the invention and the scope of the invention is, therefore, to be limited only by the appended claims.

The embodiments of the invention in which an exclusive property or right is claimed are defined as follows:

1. A frequency detector for detecting the frequency of vibration of an apparatus comprising:
   first vibration sensing means for providing a first output having a first frequency response to said frequency of vibration;
   second vibration sensing means for providing a second output having a second frequency response to said frequency of vibration;
   difference sensing means connected to said first and second vibration sensing means for providing a third output dependent upon the difference between said first and second outputs; and,
   load means having a reset amplifier connected to said difference sensing means for being responsive to the output from said difference sensing means.

2. The detector of claim 1 wherein said first and second vibration sensing means comprises corresponding first and second transducers responsive to said frequency of vibration for providing first and second electrical outputs.

3. The detector of claim 2 wherein said first and second vibration sensing means further comprises corresponding first and second reeds connected to said apparatus, said first and second transducers being arrayed to be responsive to said corresponding first and second reeds, said first reed having a first length for providing said first frequency response and said second reed having a second length for providing said second frequency response.

4. The detector of claim 3 wherein said difference sensing means comprises a differential amplifier having a positive input connected to receive said first output and a negative input connected to receive said second output.

5. The detector of claim 4 wherein said reset amplifier comprises an amplifier having a negative input and a positive input, and a capacitor connected between an output of said reset amplifier and said negative input.

6. The detector of claim 1 wherein said first and second vibration sensing means comprises corresponding first and second reeds connected to said apparatus, said first reed having a first length so that said first vibration sensing means provides said first frequency response and said second reed having a second length so that said second vibration sensing means provides said second frequency response.

7. The detector of claim 6 wherein said difference sensing means comprises a differential amplifier having a positive input connected to receive said first output and a negative input connected to receive said second output.

8. The detector of claim 1 wherein said difference sensing means comprises a differential amplifier having a positive input connected to receive said first output and a negative input connected to receive said second output.

9. A system for controlling the frequency of vibration of an apparatus at a desired frequency comprising:
   first vibration sensing means for providing a first output having a first frequency response to an actual frequency of vibration of said apparatus;
   second vibration sensing means for providing a second output having a second frequency response to said actual frequency of vibration of said apparatus, said first and second frequency responses banding said desired frequency of vibration;
   difference sensing means connected to said first and second vibration sensing means for providing a third output dependent upon the difference between said first and second outputs, said third output being indicative of the deviation of said actual frequency of vibration of said apparatus from said desired frequency of vibration; and,
   control means responsive to said third output for controlling said apparatus at said desired frequency.

10. The detector of claim 9 wherein said first and second vibration sensing means comprises corresponding first and second transducers responsive to said actual frequency of vibration for providing first and second electrical outputs.

11. The detector of claim 10 wherein said first and second vibration sensing means further comprises corresponding first and second reeds connected to said apparatus, said first and second transducers being arrayed to be responsive to said corresponding first and second reeds, said first reed having a first length for providing said first frequency response and said second reed having a second length for providing said second frequency response.

12. The detector of claim 11 wherein said difference sensing means comprises a differential amplifier having a positive input connected to receive said first output and a negative input connected to receive said second output.

13. The detector of claim 12 wherein said load means comprises a reset amplifier connected to receive said third output.

14. The detector of claim 13 wherein said reset amplifier comprises an amplifier having a negative input and a positive input, and a capacitor connected between an output of said reset amplifier and said negative input.

15. The detector of claim 14 wherein said load means further comprises control actuator means having an input connected to the output of said reset amplifier, said control actuator means controlling the vibration of said apparatus at said desired frequency.

16. The detector of claim 11 wherein said first and second vibration sensing means comprises corresponding first and second reeds connected to said apparatus, said first reed having a first length so that said first vibration sensing means provides said first frequency response and said second reed having a second length so that said second vibration sensing means provides said second frequency response.

17. The detector of claim 16 wherein said difference sensing means comprises a differential amplifier having a positive input connected to receive said first output and a negative input connected to receive said second output.

18. The detector of claim 17 wherein said load means comprises a reset amplifier connected to receive said third output.

19. The detector of claim 9 wherein said difference sensing means comprises a differential amplifier having a positive input connected to receive said first output and a negative input connected to receive said second output.

* * * * *